Patented July 17, 1951

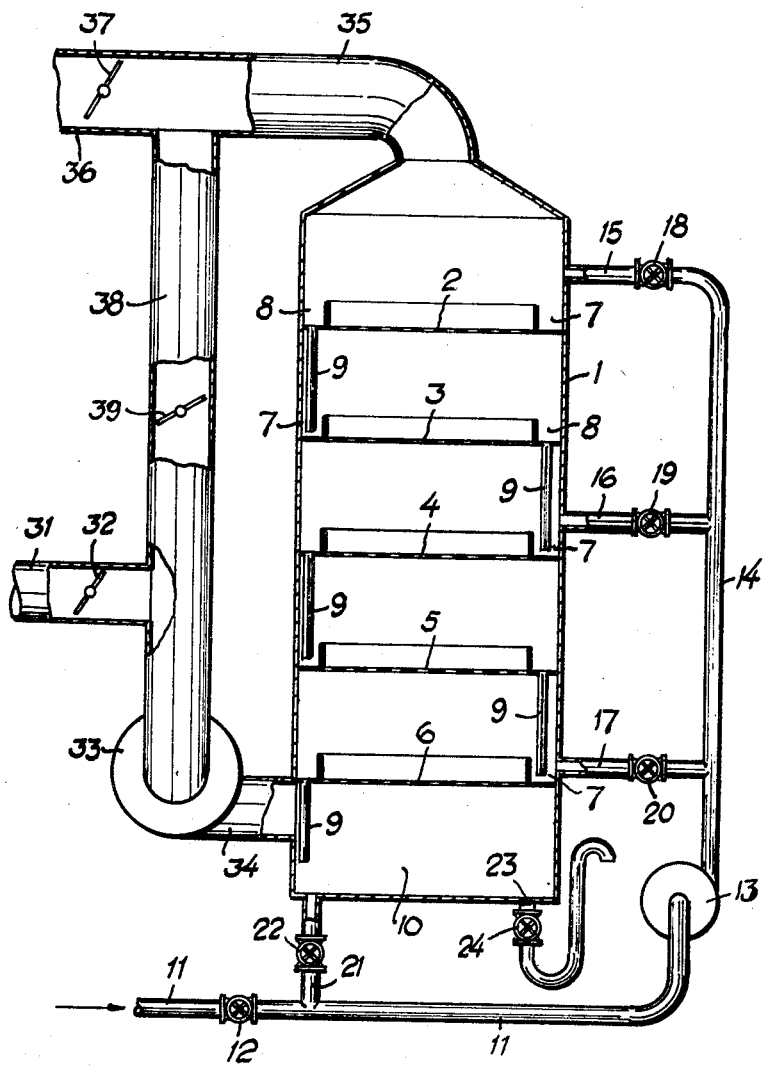

2,560,978

UNITED STATES PATENT OFFICE 2,560,978

METHOD FOR AERATING WATER

Alef Ruben Persson, Hedemora, and Johan Olof Naucler, Stocksund, Sweden

Application January 17, 1947, Serial No. 722,700
In Denmark May 18, 1943

Section 1, Public Law 690, August 8, 1946
Patent expires May 18, 1963

5 Claims. (Cl. 210—16)

The present invention relates to methods for aerating liquids and has for its particular object a method for removing gases, such as carbonic acid and malodourous substances, for instance smell and taste of humus of algae, from water, or supplying special gaseous substances, such as oxygen, to water.

It has previously been suggested to aerate supply manufacturing waters by passing air through a bulk of water. For this purpose there have also been used false bottoms or perforated plates, so-called strainer plates, over which the water to be treated has been passed, while the air has been pressed or sucked through the perforation, so as to form a froth of the water. The holes may be round, oval or slit-formed. The best effect is obtained when in the liquid a layer is formed of polyhedric gas bubbles situated close by one another and surrounded by the liquid. Such a layer is formed, for instance, if the free sectional area of the holes of the strainer plates correspond to a diameter of 1.5 to 2.5 millimeters and if the mutual distance of the holes is 8 to 20, suitably 10 to 14 millimeters.

In aerating in the above manner and for the above purpose it has been found that difficulties often arise in consequence of freezing on the strainer plates, if the gas to be subjected to contact with the liquid has a temperature which is lower, particularly if considerably lower, than the freezing point of the liquid and the temperature of the liquid is rather close to this freezing point. These freezing difficulties are connected with the fact that a relatively great gas supply per unit of area of the strainer plate, in the following called gas load, is required for the accurate function of the strainer plate and that, as a rule, not the gas supply but instead the size of area of the strainer plate has proved to be decisive for performing a given process.

In spite of the relatively great gas load thus required for strainer plates when, for instance, air is passed through a liquid layer on a strainer plate, the air becomes almost saturated with water and the saturation process thus reaches almost equilibrium between gas and liquid water. With regard to a number of other processes, such as the removal of carbonic acid or smells, there is, however, far from sufficient time for the equilibrium to be established.

It has now been found that these difficulties may be overcome by regulating in accordance with the present invention the temperature of the liquid in such a manner that one and the same body of air is repeatedly brought into contact with the water, for instance, by recirculating a portion of the air. Preferably the body of air is subjected to contact with the water in several contact devices connected in series with regard to the liquid and/or the gas.

In both cases the degree of the gas load and the size of the strainer plate area are maintained but the gas supply is reduced. Since the latter determines the rate of cooling it is consequently possible to reduce the cooling by one of these measures.

It is a great advantage with the present method that the treatment can be performed with good result directly on the raw water, that is, without subjecting the latter to a pretreatment by filtering, precipitation, chlorination or the like.

The invention will now be described with reference to the accompanying drawing which is an elevation view, partially in section, of a multi-level strainer plate apparatus adapted for treating water in accordance with the method of the invention, but it is to be understood that the invention will not be limited as to its scope by this description.

In the drawing, reference numeral 1 indicates a tower equipped with a plurality of strainer plates 2, 3, 4, 5, 6, one arranged above the other. Each strainer plate is provided with an inlet pocket 7 at the one end and with an outlet pocket 8 at the other end, the latter pocket being provided with an outlet pipe 9 ending in the inlet pocket 7 of the strainer plate next below. The outlet pipe 9 from the lowermost strainer plate ends, however, in the collecting tank 10 at the bottom of the tower. The number of strainer plates may be varied according to the conditions. In this case, the tower contains five strainer plates.

The water to be treated is entered through the pipe 11 containing the valve 12 and is elevated by the centrifugal pump 13 through head line 14 so as to be introduced into the inlet pocket 7 of one of the strainer plates 2, 4 or 6 through branch pipes 15, 16 or 17, respectively, containing valves 18, 19 and 20, respectively. From the inlet pocket 7 the water flows out over the partition forming the wall of said pocket, across the associated strainer plate 2, 4 or 6, and over the partition at the other end of the plate into outlet pocket 8. As air is blown through the plate from below, supplied through pipe 34, the water is transformed into a layer of foam the height of which will usually be on the order of 400 millimeters or greater. The partitions forming the walls of the pockets 7 and 8 aid in controlling the depth of the water layer maintained on the strainer plate. The excess water which flows into outlet pocket 8 is discharged through pipe 9 to the next lower strainer plate in the tower. At the bottom of the collecting tank 10 two outlets are provided, the one 21 containing valve 22 being provided for connecting the collecting tank with the inlet pipe 11 and the other 23 containing valve 24 being the outlet for water treated in the apparatus.

The treating air is introduced through inlet pipe 31 containing the regulating damper 32 and is forwarded through the apparatus by means of the ventilator or fan 33 passing the air through pipe 34 into the upper portion of the collecting tank 10 below the lowermost strainer plate 6. Having passed the tower 1 the air is taken by the outlet pipe 35 and is either exhausted through the pipe 36 containing the damper 37 or, at least partly, returned to the ventilator 33 through pipe 38 containing the damper 39.

So as to comply with the requirement of the present invention, the apparatus described above may be operated in different ways. According to one embodiment, the water to be treated is supplied through pipes 11, 14 and 15 to the inlet pocket 7 of the uppermost strainer plate 2 or, if desired, through branch pipe 16 to the inlet pocket 7 of the middle strainer plate 4. The valves 19 and 20, or only 20, respectively, are then closed. The water will flow over each strainer plate from the inlet pocket 7 to the outlet pocket 8 and from there through the outlet pipe 9 to the inlet pocket 7 of the next strainer plate and so on until the water reaches the collecting tank 10. From there it is discharged through the outlet pipe 23 by opening valve 24. If the degree of purification is not sufficient, a portion of the water may be returned through connection pipe 21 by more or less opening valve 22. The treating air is in this case passed normally only once through the apparatus. It is introduced through pipe 31, ventilator 33 and pipe 34 to the bottom of the tower 1 and having passed in turn the strainer plates it is exhausted through pipes 35 and 36. In this case, the dampers 32 and 37 are more or less open and damper 39 is closed. According to a modification of this embodiment, a portion of the treating air may be returned through pipe 38 by opening damper 39 and closing damper 32 to such a degree that the desired return of air will be attained.

According to another embodiment of the invention, the repeated contact of the air with the water is reached by using only one strainer plate and recirculating a great portion, preferably the main portion, of the treating air. In this case, the water is introduced through pipes 11, 14 and 17 into the inlet pocket 7 of the lowermost strainer plate 6, valves 18 and 19 then being closed and valve 20 being open. Damper 39 is then open and dampers 32 and 37 are open only as much as to count for the necessary renewal of treating air. Some of the water may in this case be recirculated through pipe 21.

The two embodiments, now described, represent two extreme modes of operation. It is, however, evident that between these extremes many intermediate modifications are possible, all of which being covered by the claims attached hereto.

As an example of the effect of a treatment in accordance with the invention, an operation carried out in full commercial scale relating to the removal of carbonic acid ($CO_2$) from supply waters will be mentioned. By means of a strainer plate aerator the content of $CO_2$ was lowered from 30 milligrams per liter to 4.5 milligrams per liter without recirculation or return of air employed. In this case such temperature conditions were prevailing that usual aerating without recirculation could be performed. When, however, under otherwise equal conditions such a comparatively great proportion of the air as two thirds thereof were made continuously to circulate, i. e. to be returned to the strainer plate, it was nevertheless possible from 30 milligrams $CO_2$ per liter to reach 5.5 milligrams per liter, i. e. not far from the result attained when no returning was used. This is to be considered as a good result particularly with regard to the fact that the aerating could not be carried out at all in case it was performed under a certain critical temperature at which the operation should give rise to freezing (ice formation).

For the removal of a voltaile substance from a liquid the flow velocity of the liquid should be kept below 500 and preferably below 300, e. g. at about 100 liter per cross-meter (i. e. per meter of the width of the liquid stream) per minute. The height of the liquid layer which should be formed and flow over the strainer plate or the like, in case the holes of the latter were filled up, should preferably be over 10 to 15, or even over 20 millimeters, e. g. about 30 millimeters. The height of this bubble-free liquid layer is suitably regulated by means of an overflow or by a choke in the inlet and/or the outlet circuit. For the purpose in question it has been found that the gas should preferably be supplied with a velocity corresponding to a supply of less than about 40 or 30, and preferably between about 20 and 10 cubic meters per minute per square meter of the strainer plate or the like.

When the humus smell is to be decreased in or removed from humus smelling waters it has been found suitable to treat the water with more than 50, preferably 100 to 200, e. g. 150 and, if desired, 300 cubic meters of air (including return air) per cubic meter of water. For waters having an algal smell the corresponding figures are 10, preferably 25 to 50, e. g. 35 and, if desired, 75 to 100 cubic meters of air per cubic meter of water.

In several cases, particularly in large installations, it is preferred to employ the embodiment consisting in passing one and the same body of air in series through a number of strainer plates over which the water is made to flow in series countercurrently to the air. This performance has the advantage that a smaller floor space is required by it than by the performance where a single and, therefore, larger strainer plate is used, provided, of course, that the strainer plates are placed one above the other. The total area of the strainer plates in this multiple-bottom apparatus need not be greater but may instead be smaller than the area of the single strainer plate in a one-bottom apparatus having the same capacity. A further important advantage is attained inasmuch as the power demand for the ventilator or the like is decreased when the number of strainer plates is increased, provided that the total strainer plate area is constant or substantially constant, since the fixed losses, particularly in the ventilator, are practically independent of the air quantity passing the ventilator per unit of time.

This will be evident from the following consideration.

The power demand E for the ventilator is determined by the formula $$E = C \cdot Q \, (d+f)$$

where C is a constant, Q air quantity passing the ventilator per unit of time, $d$ the counterpressure of each strainer plate and $f$ the fixed losses ($d$ and $f$ being taken in the same kind of unit). When using one strainer plate, the power demand is $$E_1 = C \cdot Q_1(d+f)$$

and when using $n$ strainer plates, the total area of which being equal to that of the sole strainer plate just mentioned, the power demand is $$E_n = C \cdot \frac{Q_1}{n}(n \cdot d + f) = C \cdot Q_1\left(d + \frac{f}{n}\right)$$

This shows that $E_n$ becomes the smaller, the greater $n$ is.

In addition to the advantages of the invention stated above, the repeated contact of one and the same body of treating gas with the water will improve the removal of the objectionable smell by increasing the treating temperature relative to that otherwise obtainable. This effect will be had whenever the entering gas is colder than the water even if there is no risk of freezing.

What we claim is:

1. A method of aerating supply liquids having a temperature close to the freezing point thereof with atmospheric air initially having a temperature below said freezing point comprising the steps of passing said supply liquid in the form of of a flowing layer across a perforated strainer plate, passing a given body of said atmospheric air having an initial temperature below the freezing point of said liquid through the perforations of said strainer plate and through said layer of liquid, the size and spacing of the perforations of said strainer plate being so selected that said passage of air therethrough and through said layer of liquid forms a foam of polyhedric bubbles, repeating such passage of at least a portion of said body of air, and so adjusting the flow of air and liquid that a given volume of liquid is passed through by a total volume of air at least ten times the said volume of liquid.

2. A method of aerating supply liquids as defined in claim 1 wherein the supply liquid is passed across a plurality of perforated strainer plates in the form of a plurality of flowing layers and the given body of atmospheric air is passed in series through the perforations of said strainer plates and through said layers of liquid.

3. A method of removing difficultly removable volatiles from volatile containing liquids having a temperature close to the freezing point thereof by aeration with atmospheric air initially having a temperature below said freezing point comprising the steps of passing said volatile containing liquid across a plurality of perforated strainer plates in the form of a plurality of flowing layers, passing a given body of said atmospheric air having an initial temperature below the freezing point of said liquid in series through the perforations of said strainer plates and through said layers of liquid, the size and spacing of said perforations being so selected that said passage of air therethrough and through said layers of liquid forms in each layer a foam of polyhedric bubbles, returning a portion of said body of air to said layers for repeated passage therethrough in mixture with a quantity of fresh atmospheric air having an initial temperature below the freezing point of said liquid, and so adjusting the flow of air and liquid that a given volume of liquid is passed through by a total volume of air at least ten times the said volume of liquid.

4. A method of aerating supply liquids having a temperature close to the freezing point thereof with atmospheric air initially having a temperature below said freezing point comprising the steps of passing said supply liquid in the form of a flowing layer across a perforated strainer plate, passing a given body of fresh air at atmospheric pressure, and having an initial temperature below the freezing point of said liquid, through the perforations of said strainer plate and through said layer of liquid, the size and spacing of the perforations of said strainer plate being so selected that said passage of air therethrough and through said layer of liquid forms a foam of polyhedric bubbles, returning the major portion of said body of air to said layer for repeated passage therethrough, and so adjusting the flow of air and liquid that a given volume of liquid is passed through by a total volume of air at least ten times the said volume of liquid.

5. A method of aerating supply liquids having a temperature close to the freezing point thereof with atmospheric air initially having a temperature below said freezing point comprising the steps of passing said supply liquid in the form of a flowing layer across a perforated strainer plate, passing a given body of atmospheric air having an initial temperature below the freezing point of said liquid through the perforations of said strainer plate and through said layer of liquid, the size and spacing of the perforations of said strainer plate being so selected that said passage of air therethrough and through said layer of liquid forms a foam of polyhedric bubbles, whereby heat is transferred from said liquid to said air, mixing a portion of said body of air after passage through said layer with a quantity of fresh atmospheric air having a temperature below the freezing point of said liquid, whereby the latter quantity of air is heated by the heat transferred from said liquid, passing the thus mixed air through the perforations of said strainer plate and through said layer of liquid, and so adjusting the flow of air and liquid that a given volume of liquid is passed through by a total volume of air at least ten times the said volume of liquid.

ALEF RUBEN PERSSON.
JOHAN OLOF NAUCLÉR.

REFERENCES CITED

The following references are of record in the file of this patent:

UNITED STATES PATENTS

| Number | Name | Date |
|---|---|---|
| 368,071 | Coes | Aug. 9, 1887 |
| 973,263 | Darapsky | Oct. 18, 1910 |
| 1,047,534 | Joseph | Dec. 17, 1912 |
| 1,725,925 | Kent | Aug. 27, 1929 |
| 1,738,543 | Travers | Dec. 10, 1929 |
| 1,958,383 | Naucler et al. | May 8, 1934 |
| 2,022,329 | Tsuda | Nov. 26, 1935 |
| 2,077,652 | Wessblad et al. | Apr. 20, 1937 |
| 2,115,188 | Atkinson et al. | Apr. 26, 1938 |
| 2,128,617 | Lawlor | Aug. 30, 1938 |

FOREIGN PATENTS

| Number | Country | Date |
|---|---|---|
| 11,639 | Great Britain | A. D. 1909 |
| 523,991 | Germany | May 7, 1931 |